United States Patent [19]

Olson

[11] Patent Number: 4,939,753
[45] Date of Patent: Jul. 3, 1990

[54] TIME SYNCHRONIZATION OF CONTROL NETWORKS

[75] Inventor: Gene H. Olson, Minneapolis, Minn.

[73] Assignee: Rosemount Inc., Eden Prairie, Minn.

[21] Appl. No.: 314,902

[22] Filed: Feb. 24, 1989

[51] Int. Cl.5 .............................................. H04L 7/04
[52] U.S. Cl. ................................. 375/107; 370/100.1; 340/825.14
[58] Field of Search ................... 375/106, 107; 370/16, 370/54, 100, 85.6, 100.1; 371/11.2; 340/827; 364/131, 132, 138

[56] References Cited

U.S. PATENT DOCUMENTS

| | | | |
|---|---|---|---|
| 4,276,643 | 6/1981 | Laprie et al. | 371/11.2 |
| 4,390,984 | 6/1983 | Sugiura et al. | 371/11.2 |
| 4,551,833 | 11/1985 | Turner | 370/54 |
| 4,763,329 | 8/1988 | Green | 371/11.2 |
| 4,797,881 | 1/1989 | Ben-Artzi | 370/85.14 |

Primary Examiner—Benedict V. Safourek
Attorney, Agent, or Firm—Kinney & Lange

[57] ABSTRACT

A distributed computer network is synchronized as to time provided to each peerway and its associated stations or nodes. Highway interface adapters (HIAs) serve as time references for each node on a peerway and as communication links between peerways. At periodic intervals, each HIA transmits a Time Interval Control packet (TIC) including the time of day and an ordinal number denoting the HIA priority in the network and a distance factor. By comparing ordinal numbers, an HIA will adjust its clock to the TIC packet being transmitted from the HIA with the highest priority and the smallest distance. This ensures that a synchronized time is provided to each node on the network from a single source over an optimal distance.

20 Claims, 3 Drawing Sheets

TIME SYNCHRONIZATION OF CONTROL NETWORKS

BACKGROUND OF THE INVENTION

1. Field of the Invention.

This invention relates to synchronizing operation of stations in separate control networks and in particular to a system in which an interface station in one network communicates synchronization data over a data link to stations in another network.

2. Description of the Prior Art.

A distributed control system typically consists of several Local Area Networks (LANs) interfaced via point-to-point data links. Each LAN typically comprises a plurality of stations such a microcomputers, controllers, loggers, visual displays or printers that are connected to a communication medium, such as a bus, which is common to all of the devices in the LAN. The common communication medium can take any one of various forms, including a parallel or serial bus over which individual stations can be addressed for communication. Some stations on the LAN are active in the sense that they can initiate transmissions on the bus. Other stations are passive in that they only respond when addressed by another device on the bus. The point-to-point data links used to interface the LAN's can take many different forms, including electrical cabling, optical fibers, microwave channels, or phone lines. The point-to-point links can also include devices such as low speed MODEMS and can introduce time delay in the communication link.

In distributed control systems, it is useful to achieve system synchronization, that is, some stations in different LAN's must be timed to work with one another, or have the same time reference. Such synchronization is crucial in automatic control systems to ensure the correct timing of events, and is crucial in communication systems to ensure efficient use of a communication link.

SUMMARY OF THE INVENTION

The present invention concerns achieving synchronization in a system comprising a plurality of networks. Each network has a communication medium or bus common to stations or nodes in that network. An interface station, called herein a Highway Interface Adapter or HIA in one network transmits timing, control, and information over a data link to an HIA in another network. The system can comprise multiple data links so that, if one data link breaks or fails, there are still paths along other data links to maintain communication among the networks. Each HIA has a synchronizable timing source which can receive a synchronization signal and provide a timing output adjusted by the synchronization signal. The timing sources synchronize one another and also provide an ordinal number output indicating the order in which the timing sources are currently synchronized. The ordinal number is used in determining which timing source has priority in providing timing signals for each station in the system.

Each timing output includes a distance field to ensure that the synchronized time is provided to a LAN over an optimal distance. This is generally chosen such that synchronized time is provided to each station through the path providing the minimum delay time.

In preferred embodiments of the present invention, at least one HIA is connected to each bus. The HIA provides timing output to stations on the bus to which it is connected. HIA also couples the timing output to another HIA via the data link connected to those two HIAs. Through the use of multiple HIAs and multiple data links, all of the networks in the system exchange time references and communicate data with one another. A serial link, for example, can be used to interconnect the HIAs.

Each HIA is assigned a unique intrinsic ordinal number denoting that HIA's priority within a continuum of priorities. Prior to system synchronization, each HIA's intrinsic ordinal is placed in that HIA's ordinal transmit register. Each ordinal includes priority information along with the above-mentioned distance field. The distance field in an intrinsic ordinal is zero because this is the distance an HIA is from itself.

At periodic time intervals, each HIA transmits a Time Interval Control (TIC) packet. The TIC packet includes the time and the ordinal stored in its ordinal transmit register. In the TIC to be transmitted, the distance field is increased by a predetermined amount to reflect the "distance" assigned to the media the packet is to be transmitted on. Normally, the distance over a link between the HIA's is defined to be greater than the distance along a data bus.

Upon receiving a TIC packet from another HIA, the receiving HIA compares the ordinal number contained in the received TIC packet to the ordinal currently in its ordinal transmit register. If the received ordinal number has greater priority than the ordinal currently in its ordinal transmit register, the receiving HIA adopts the ordinal number as its own. This is done by replacing the ordinal in the ordinal transmit register with the received, higher priority ordinal.

Similarly, at periodic time intervals, the HIA transmits a TIC packet to its own bus and through a data link to another HIA using the ordinal in its ordinal transmit register. This is either its own unique intrinsic ordinal number, or another HIA's ordinal number with a modified distance field.

When a TIC packet is received by an HIA from an HIA having higher priority and a smaller distance field, the receiving HIA will adjust its internal clock based upon the time provided by the transmitting HIA. By using time data provided in the TIC packet transmitted by the HIA having the largest priority data and the smallest distance data, a synchronized time is provided to each highway over a optimal (and normally shortest) communication distance.

In one preferred embodiment of the invention, the time data contained in a TIC packet comprises the current time and a time correction factor. The time correction factor is an estimate of the time delay an HIA must wait before it receives the packet. Thus, the receiving HIA adjusts its clock by an amount equal to the current time plus the time correction factor.

In the preferred embodiment of the invention, an HIA transmits its own unique intrinsic ordinal number if, after a specified time elapses, the HIA has not received a TIC packet from another HIA with a higher priority ordinal or an equal priority ordinal and a smaller distance. The HIA will then continue to send out TIC packets using its own ordinal number and current time until it receives a TIC packet having a greater priority ordinal number as described above. Thus, if there is a communication breakdown somewhere in a data link, the system will reconfigure itself through the remaining data paths in a manner similar to that described above, such that time is always being provided by one HIA to each peerway over an optimal distance.

DETAILED DESCRIPTION OF THE PREFERRED EMBODIMENTS

Figure 1:
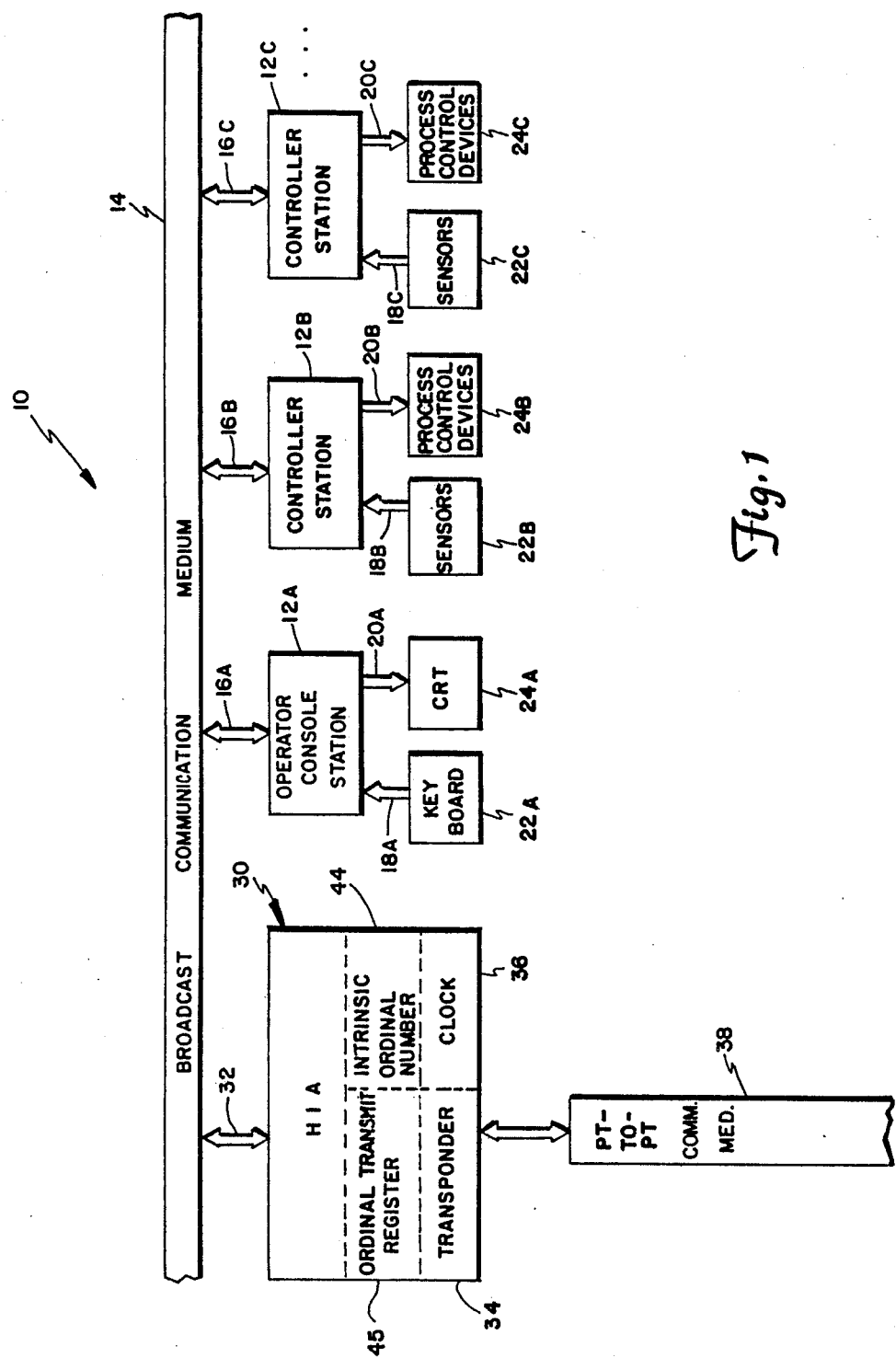
FIG. 1 is an electrical block diagram of a data communication system.

In FIG. 1, a data communications system 10 includes a plurality of stations or nodes 12A-12C coupled to a common communication medium 14 by lines 16A-16C, respectively. For purposes of this description, system 10 will be described and discussed as a "peerway" to denote the fact that in operation each of the nodes 12A-12C has equal priority for communicating on the common communication medium 14. The number of nodes connected to communication medium 14 will, of course, vary from system to system, and the depiction and description of three nodes 12A-12C is simply for the purpose of illustration.

The present invention automatically assigns one node as the time source for itself and every other node located on the entire distributed data communication system 10. Such assignment takes place in an orderly manner so that each node is synchronized and there is no confusion about which node should be providing the time. There is also an orderly way of reconfiguring the system if there is a break in one of the communication links.

Communication medium 14 preferably comprises a cable, optical waveguide, or radio or microwave frequency communication medium for carrying signals such as packets of data or control messages among nodes 12A-12C. In a preferred embodiment, these data packets are in the form of serial data.

Nodes 12A-12C are stations located on the peerway and may take various forms, including microprocessor-based controllers, data loggers, and operator input/output consoles. Each node 12A-12C typically receives inputs through lines 18A-18C and provides outputs through lines 20A-20C, respectively. The particular types of inputs and outputs, and the numbers of inputs and outputs depend, of course, upon the particular nature of each station. For purposes of illustration, node 12A is an operator input/output console, and nodes 12B and 12C are individual microprocessor-based process controllers.

Operator console 12A receives inputs through line 18A from the keyboard 22A and provides outputs through line 20A to a cathode ray tube (CRT) monitor 24A. Controllers 12B-12C receive input signals on lines 18B-18C from sensors 22B-22C, respectively. The inputs from sensors 22B-22C represent process variables which are used by controllers 12B-12C in controlling a particular process. The outputs of controller stations 12B-12C are in the form of process control signals which are supplied through lines 20B-20C to process-control devices 24B-24C, respectively.

In a typical embodiment of the system 10, process variables sensed by sensors 22B-22C include temperature, pressure, and other well-known process variables. Process control devices 24B-24C take various forms, including valves, motors, and other devices which can be actuated by process control signals. Each controller 12B-12C typically controls several individual process control devices, and receives inputs from several different sensors. The process control signals supplied by a particular controller (for example controller 12B) are typically a function of several process variables. In a distributed process control system, some of the process variables may initially be received as inputs at another node (for example controller 12C). Peerway 10 provides communication among the various nodes 12A-12C, so that process variables and other information and data needed to provide outputs at the various nodes 12A-12C can be communicated rapidly, efficiently, and with a minimum likelihood of error.

On peerway 10 there exists at least one of a particular type of node or station that is referred to as Highway Interface Adapter (HIA) 30. HIA 30 is coupled to the common communication medium 14 by line 32. Each HIA 30 has associated with it a timekeeping means or clock 36 that provides a stable time reference for HIA 30. Each HIA 30 also contains a transponder 34 that is used to receive and transmit data from other HIA's located on other peerways over point-to-point communication medium 38. The received and transmitted data is in communication with the HIA 30. Each HIA 30 has associated with it an intrinsic ordinal number 44 that denotes its priority within a continuum of priorities for HIA 30. The intrinsic ordinal number 44, for example, may be set by connecting a series of electrical jumper wires, and may be chosen such that the most centralized HIA has the highest priority in supplying time signals.

Each HIA 30 also includes an ordinal transmit register 45 which may be, for example, Random Access Memory (RAM) and is used for temporarily storing ordinal numbers as described below.

Figure 2:
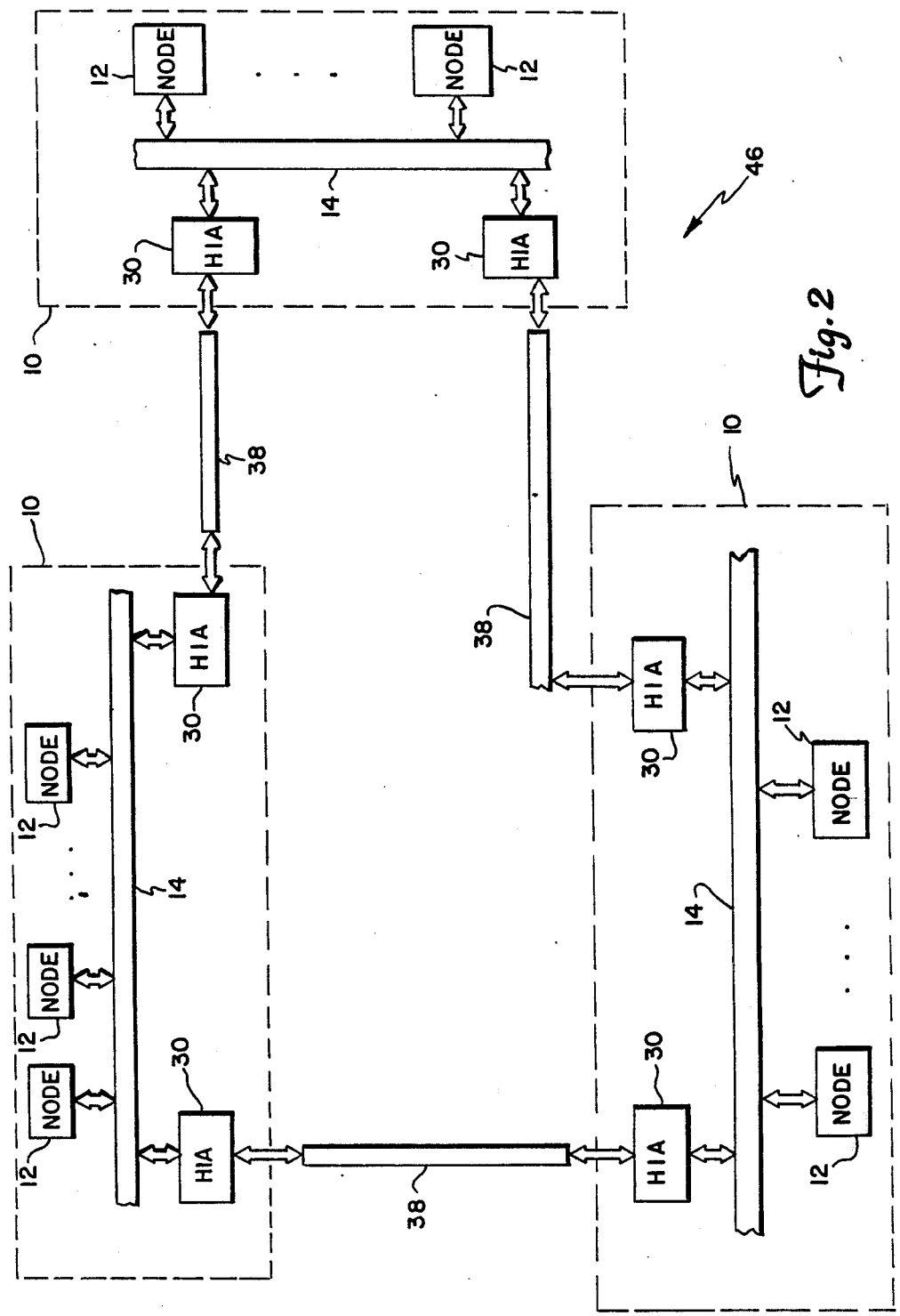
FIG. 2 is a diagram illustrating a network formed by an interconnected arrangement of the data communication systems of FIG. 1.

FIG. 2 is illustrative of a distributed communication network 46 having a plurality of peerways 10 that are interconnected via HIAs 30. In the present embodiment of the invention each peerway 10 contains nodes 12 and at least one HIA 30 that is connected over point-to-point communication medium 38 to another HIA located on another peerway 10. Each HIA 30 shown in FIG. 2 has its own intrinsic ordinal number 44. Each common communication medium 14 and each point-to-point communication medium 38 is assigned a distance value. This distance value may be chosen to reflect the time it takes messages to be transmitted over that medium. Furthermore, each peerway 10 is assigned a peerway number which becomes part of an HIA's priority data as described below.

Figure 3:
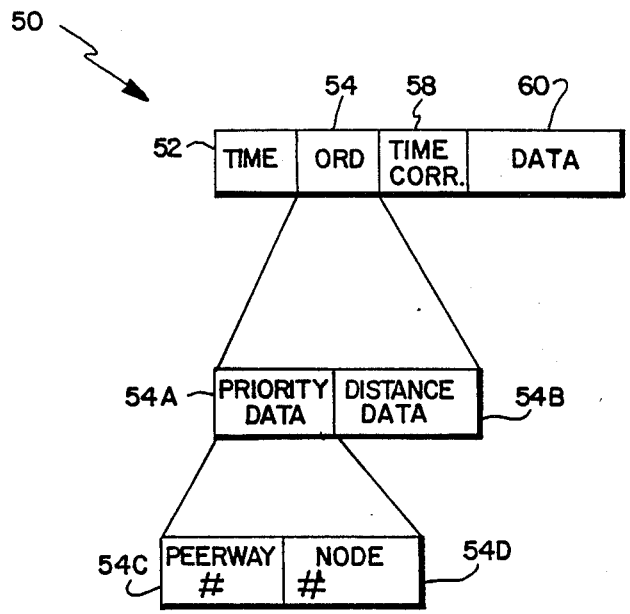
FIG. 3 is a diagram illustrating a Time Interval Control (TIC) packet used in the data communication systems and network of FIGS. 1 and 2.

FIG. 3 is illustrative of a Time Interval Control (TIC) packet indicated generally at 50. Such TIC packets 50 are one of the many types of data that are received and transmitted by the HIAs 30 along the point-to-point communication media 38 or the common communication media 14. A typical TIC packet 50 transmitted by HIA 30 comprises a time of day 52, the transmitting HIA's present ordinal number 54 derived from the transmitting HIA's ordinal transmit register 45, a time correction factor 58 and other data 60 which may include check-sums, addresses, and other information. The ordinal number 54 further comprises priority data 54A, which is comprised of the peerway number 54C and the node number 54D of the HIA that is providing the time 52. The ordinal number 54 also contains distance data 54B which may be representative of the distance to the HIA supplying the time 52. A time correction factor 58 is included in the TIC packet 50 and is comprised of data representing an estimate of the time TIC packet 50 will be delayed before it is received by another HIA.

In the preferred embodiment of the present invention one HIA 30 will provide the time to each node 12 located on its particular peerway 10 which in turn will have its clock 36 synchronized with a single HIA having the highest priority data 54A and the lowest distance data 54B. By definition each node 12 will synchronize its time with the time provided in the TIC packet 50 that is transmitted from the HIA 30 on the peerway 10 and which has the intrinsic ordinal number 44 with the highest priority which has been transmitted over the path which yields the lowest distance data 54B. Thus, if a distributed computer network only contains one peerway 10 with a plurality of HIAs 30, time will be provided to each node on the peerway from the HIA having the intrinsic ordinal number 44 with the highest priority. In a distributed computer network 46 having a plurality of peerways 10 interconnected through HIAs 30 over point-to-point communication media 38, time will be provided by the HIA 30 having the intrinsic ordinal number 44 with the highest priority on the entire network 46. Additionally, time will be provided over the path which yields the lowest distance data 54B.

Upon initialization of the distributed computer network 46, each HIA will load its intrinsic ordinal number 44 into its ordinal transmit register 45, and each HIA 30 will periodically transmit a TIC packet 50 with data that includes the time of day 52 according to that particular HIA's clock 36, that particular HIA's intrinsic ordinal number 44 as contained in its ordinal transmit register 45, the peerway number 54C and node number 54D on which that particular HIA 30 is located, and a time correction factor 58. When an HIA 30 receives a TIC packet 50, the receiving HIA compares the ordinal number 54 contained in the received TIC packet 50 to its present ordinal number contained in its ordinal transmit register 45. If the priority data 54A is greater than the priority data of the receiving HIA's present ordinal number contained in its ordinal transmit register 45, the receiving HIA will adopt the received ordinal number 54 contained in the received TIC packet 50 as its own ordinal number by placing it in its ordinal transmit register 45. Once a received ordinal number 54 is adopted, an HIA 30 will transmit its TIC packets 50 using the adopted ordinal number stored in ordinal transmit register 45.

Before a TIC packet 50 is transmitted, an HIA 30 will increase the distance data 54B to reflect the distance over which the TIC packet is to be transmitted. In one embodiment of the invention, the distance along a common communication medium 14 is defined to be two while the distance across a point-to-point communication medium 38 is defined to be three. These values may, of course, be adjusted to reflect slower communication media, or media which for other reasons it is desirable to place at lower priority. An HIA is always considered to be zero distance away from itself. If an HIA 30 receives a TIC packet 50 from another HIA 30 having the same ordinal number 54 as the receiving HIA's own ordinal number contained in its ordinal transmit register 45, the receiving HIA will adjust its clock 36 to equal the time provided by the HIA (either itself or the other transmitting HIA) having the smallest distance data.

Once the network has stabilized, each HIA 30 will be transmitting its TIC packet 50 using the same priority data in its ordinal number 54. The only difference in the TIC packets 50 being transmitted over the network is that the distance data 54B of the ordinal number 54 will vary depending on the path the TIC packet 50 is being sent over. Each HIA 30 receives TIC packets 50 from other HIAs 30 that have been transmitted over a variety of paths. By requiring that each HIA then adopt the ordinal number 54 that contains the smallest distance data 54B, it is assured that the TIC packet 50 is being transmitted over a minimum distance. For example, if the highest priority data 54A of any HIA on the network is "100", soon every HIA 30 will have adopted "100" as its priority number. An HIA 30 on the system will then be receiving TIC packets 50 from other HIAs 30 using "100" as their priority data 54A but with varying distance data 54B. For example, if an HIA 30 receives a TIC packet 50 with distance data 54B equal to "5" and receives another TIC packet 50 with distance data 54 equal to "10", the first TIC packet 50 has been transmitted over a shorter communication distance. The HIA 30 will then adopt this ordinal number 54 with "100" as its priority data 54A and "5" as its distance data 54B. Before transmitting its TIC packet 50, the HIA 30 will increase the distance data 54B to reflect the communications distance over which its TIC packet 50 is to be sent, for example, the "5" from the newly adopted ordinal number 54 plus "2" if the TIC packet 50 is to be sent along a peerway 14 assigned a distance value of "2" or plus "3" if it is to be sent across a serial communication link 38 assigned a distance value of "3".

Once a system has stabilized, an HIA 30 will receive a TIC packet 50 from only the one HIA 30 that has the same priority data 54A but a smaller distance data 54B. The TIC packets 50 received from this particular HIA 30 reflect the TIC packets 50 sent from the HIA 30 having the highest priority data 54A of any HIA 30 on the system and the shortest communications path back to that HIA 30. A receiving HIA 30 will adjust its clock 36 to equal the time 52 plus the time correction factor 58 contained in the TIC packet 50 that is received from the HIA 30 having the highest priority data 54A and the lowest distance data 54B.

Accurate time is kept on the system because each time a TIC packet 50 is transmitted across a point-to-point communication medium 38, a time correction factor 58 is included in the TIC packet 50. The time correction factor 58 comprises the time the HIA 30 estimates it will take before the receiving HIA 30 receives the TIC packet 50. Thus, if an HIA 30 estimates that it will take 30 milliseconds for the receiving HIA 30 to receive the TIC packet 50, the time correction factor 58 included in the TIC packet 50 will be 30 milliseconds. The HIA 30 who receives the TIC packet 50 containing the 30 millisecond time correction factor and decides to use the received time 52 based upon the priority data 54A and distance data 54B described above, will then adjust its own clock 36 by 30 milliseconds plus the time of day 52 contained in the received TIC packet 50.

Once the network 46 has stabilized so that each peerway 10 is receiving its time from the HIA 30 having the highest priority data 54A and the lowest distance data 54B, time will be resynchronized each time the HIA 30 which is acting as time source transmits a TIC packet 50. The network 46, however, will reconfigure itself if a communication link 38 breaks down. Once network 46 has stabilized, each HIA 30 receives its time reference from the one particular HIA 30 that it knows is transmitting the highest priority data 54A and the lowest distance data 54B. If after a certain interval of time has passed and an HIA 30 has not received a TIC packet 50, the HIA 30 will readopt its own intrinsic ordinal number 44 by placing the intrinsic ordinal number 44 into the ordinal transmit register 45 and begin transmitting TIC packets 50 using that ordinal number. After lowering priority of the ordinal contained in its ordinal transmit register 45, each HIA 30 will refuse to raise the ordinal number in its ordinal transmit register 45 for a specific number of time intervals. This is done in order to decrease the time necessary for the network 46 to converge and prevent the HIA's from entering a loop in which none become the master time keeper. The HIA 30 will continue transmitting TIC packets 50 using its intrinsic ordinal number 44 until it receives an ordinal number 54 from an HIA transmitting higher priority data 54A.

The present invention, therefore, provides a method of time synchronization within a communication network which is fast, accurate, and reconfigurable if an interruption in communication within or between peerways occurs.

Although the present invention has been described with reference to preferred embodiments, workers skilled in the art will recognize that changes may be made in form and detail without departing from the spirit and scope of the invention.

What is claimed is:

1. A method of time synchronization in a distributed computer network formed by a plurality of peerways capable of communication with one another, each peerway including a plurality of nodes which communicate with one another over a communication medium and at least one node of each peerway being a Highway Interface Adapter (HIA) capable of transmitting and receiving data from at least one HIA of another peerway; the method comprising:
   periodically transmitting, from each HIA to other nodes and to at least one other HIA, data including a time value and an ordinal containing priority information;
   comparing at each HIA an ordinal containing priority information contained in data received from another HIA with an ordinal containing priority information currently being used by the HIA; and
   adopting at each HIA, for subsequent transmission the ordinal contained in data received from another HIA and the time value contained in that data, if the ordinal contained in that data received has a higher priority than the ordinal currently being used which indicates that the HIA from which data was received is preferred as a source of the time value.

2. The method of claim 1 including forming each ordinal with a priority field containing data representative of a priority of the HIA transmitting the data, and a distance field containing data representative of a preferred path between the HIA transmitting the data and the HIA receiving the data.

3. The method of claim 2 wherein forming each ordinal with data representative of a preferred path includes forming each ordinal with data representative of a shortest path.

4. The method of claim 2 wherein adopting at each HIA the ordinal contained in data received from another HIA comprises adopting at each HIA the ordinal contained in data received from another HIA if the ordinal received from the HIA has a higher priority field and a smaller distance field than the priority and distance of the receiving HIA.

5. The method of claim 1 wherein periodically transmitting data includes transmitting a time correction factor for adjusting the clock of the receiving HIA.

6. The method of claim 1 including adopting at each HIA an intrinsic ordinal if the HIA stops receiving the time value from another HIA.

7. The method of claim 6 wherein adopting at each HIA an intrinsic ordinal if the HIA stops receiving the time value from another HIA includes waiting a stabilization period before adopting an ordinal received from another HIA.

8. A method of time synchronization in a distributed computer network formed by at least one communication link including at least one Highway Interface Adapter (HIA) capable of transmitting and receiving data on the communication link, the method comprising:
   each HIA periodically transmitting, on the communication link, data including a time value and an ordinal containing priority information;
   receiving at each HIA transmissions including an ordinal containing priority information and a time value, from any other HIA transmitting on the communication link;
   comparing at a receiving HIA the ordinal received from any other HIA transmitting on the communication link, with the ordinal currently being used by the receiving HIA; and
   adopting at the receiving HIA for subsequent transmission, the ordinal contained in data received from any other HIA transmitting on the communication link if the ordinal contained in the data received has a higher priority than the ordinal currently being used by the receiving HIA which indicates that the HIA from which the data was received is preferred as a source of the time value.

9. The method of claim 8 including forming each ordinal with a priority field containing data representative of a priority of the HIA transmitting the data, and a distance field containing data representative of a preferred path.

10. The method of claim 9 wherein forming each ordinal with data representative of a preferred path includes forming each ordinal with data representative of a shortest path.

11. The method of claim 9 wherein adopting at the receiving HIA the ordinal contained in data received from any another HIA comprises adopting at the receiving HIA the ordinal contained in data received from any other HIA if the ordinal received from the HIA has a higher priority field and a smaller distance field than the priority and distance of the receiving HIA.

12. The method of claim 9 wherein periodically transmitting data includes transmitting a time correction factor for adjusting the clock of the receiving HIA.

13. The method of claim 8 including adopting at each HIA an intrinsic ordinal if the HIA stops receiving the time value from another HIA.

14. The method of claim 13 wherein adopting at each HIA an intrinsic ordinal if the HIA stops receiving the time value from HIA includes waiting a stabilization period before adopting an ordinal received from another HIA.

15. An apparatus for providing time in a computer network through a preferred communications path, the apparatus comprising:
   ordinal memory means for containing information comprising an ordinal containing priority information;
   means for keeping time;
   means for transmitting data on the computer network, the data including the ordinal and a time value;
   means for receiving ordinal and time value data from the computer network, the ordinal data containing priority information; and
   means for storing the received ordinal data in the ordinal memory means if the received ordinal data has a higher priority than the ordinal stored in the ordinal memory means which indicates that received time value data is preferred as a source of the time value.

16. The apparatus of claim 15 wherein the means for storing includes means for comparing data representative of the priority of the received time value data contained in a priority field in the received ordinal with a priority field in the ordinal contained in the ordinal memory means, and data representative of the preferred communications path contained in a distance field in the received ordinal with a distance field in the ordinal contained in the ordinal memory means.

17. The apparatus of claim 16 wherein the means for comparing selects a shortest possible path.

18. The apparatus of claim 15 wherein the transmitted data includes a time correction factor for adjusting the means for keeping time.

19. The apparatus of claim 15 including means for storing an intrinsic ordinal in the ordinal memory means if ordinal and time value data are not being received by the means for receiving ordinal and time value data from the computer network.

20. The apparatus of claim 19 wherein the means for storing an intrinsic ordinal in the ordinal memory means includes a stabilization time delay means.

* * * * *

UNITED STATES PATENT AND TRADEMARK OFFICE
CERTIFICATE OF CORRECTION

PATENT NO.  : 4,939,753
DATED       : July 3, 1990
INVENTOR(S) : Gene H. Olson

It is certified that error appears in the above-identified patent and that said Letters Patent is hereby corrected as shown below:

Col. 8, line 68, insert "other" before "HIA".

Signed and Sealed this

Twenty-sixth Day of March, 1991

Attest:

HARRY F. MANBECK, JR.

*Attesting Officer*   *Commissioner of Patents and Trademarks*